Patented Nov. 24, 1942

2,303,077

UNITED STATES PATENT OFFICE 2,303,077

PROCESS OF REFINING WHITE OIL

Albert P. Giraitis, Maplewood, N. J., assignor to Standard Oil Development Company, a corporation of Delaware No Drawing. Application February 6, 1940, Serial No. 317,561

10 Claims. (Cl. 196—40)

This invention relates to the preparation of stable highly refined mineral oils with special regard to the treatment of white oil products to effect an improvement in stability.

In the preparation of white oil products the base stock is usually a distillate derived from a Mid-Continent type or a Gulf Coast type crude. The distillate is normally subjected to exhaustive sulfuric acid treatment, that is, to treatment with sulfuric acid of concentrations in case of distillates of lubricating oil consistency between 96% strength and 30% fuming acid and with volumes relative to the oil of between 15% and 50% and in the case of distillates of the kerosene and naphtha boiling ranges, between 96% strength and 20% fuming acid and with volumes relative to the oil of between 5% and 25%. The addition of the acid to the oil is seldom made in a single application, it being more usual to effect the treatment in stages with small quantities of acid and separation of the sludge so formed before the next addition of acid. After the removal from the oil of the acid sludge, the oil is neutralized. The neutralization is usually effected by a 5% to 30% alkali solution of either caustic soda or sodium carbonate applied in a single batch or as a stream in continuous treatment. The neutralized oil is then washed especially in the case of the heavier white oils to remove sulfonate soaps, preferably with a water-alcohol mixture, and then blown with steam and then air to remove traces of alcohol and water, if such are considered objectionable in the final product. Sometimes the oil is finished by a clay treatment to effect an improvement in color. The products of such processing are often chemically unstable resulting in the development during storage of corrosive compounds, garlic-like odors and unpleasant tastes, any of which changes are commercially objectionable.

In the present invention the oil distillate is, as previously, exhaustively treated with sulfuric acid, the sludge separated and the oil phase neutralized with an alkali solution preferably of 10% sodium carbonate, the alkaline solution separated, and the oil if sulfonate soaps are present, washed, preferably with a water-alcohol mixture such as of ethyl or isopropyl alcohol, to remove the soaps and the alcohol and moisture removed by blowing steam and then air through the oil. If an improvement in color is desired the product may be subsequently clay treated. In treating the oils of the kerosene and naphtha boiling ranges, the steps of washing with aqueous alcoholic mixtures after neutralization and treating with clay are usually considered unnecessary. Upon such highly refined oils the process of the present invention may be applied to effect a chemical stabilization especially with regard to overcoming the development of corrosive compounds, deterioration of color and objectionable odors and tastes.

The process is to treat the highly refined oil with a dry alkaline earth basic reacting compound either alone or in the presence of a decolorizing material such as clay. It has been found that when the alkaline earth basic reacting compound material is very finely divided, such as after treatment in a ball mill for about eighteen hours, much smaller quantities can be used to effect similar treating results. By the use of the term "alkaline earth" the broad significance of the term is intended to be conveyed, namely, to cover the oxides, the hydroxides and carbonates of the di-basic alkaline earth metals which specifically are magnesium, calcium, strontium and barium. Normal atmospheric temperatures are usually employed when the oils are treated with the alkaline earth material by percolation or filtration methods. Elevated temperatures are preferably employed when the oils are treated with the alkaline earth basic reacting compound by contact methods.

A very convenient method of processing the oils according to the present invention is to pass the oils at atmospheric temperatures through percolation filters containing the alkaline earth basic reacting compound admixed with clay. Also convenient is the method of processing the oils at atmospheric temperatures by first preparing a concentrated slurry of the alkaline earth basic reacting compound with a portion of the untreated oil and then treating the remaining portion of the oil with the slurry so prepared. Another advantageous manner of processing is to pass the oil to be treated together with pulverized alkaline earth basic reacting compound through a colloid mill and subsequently separating the solid material from the oil by either centrifuging or filtration.

The alkaline earth materials are employed to considerable advantage in the super-refining of normally clay treated oils of lubricating oil consistency and of petroleum oils of the kerosene and naphtha boiling range which are employed in the preparation of solvents, lacquers and spray compositions. Processing these oils according to the invention improves the stability of the oils especially with regard to obviating for all practical purposes the development of objectionable odors and corrosive compounds.

It is appreciated that the alkaline earths have been previously employed in treating petroleum oils. The uses in the past have been mainly in connection with those of aqueous solutions and aqueous suspensions of the materials and for the treatment of crude stocks for purposes of neutralization and the removal of hydrogen sulfide. As refining agents their uses have been somewhat limited because of their relatively low solubilities in water and because of the development in many cases of treating emulsions due to the formation of sulfonate soaps which are potent emulsifiers. It is believed the present invention is the first satisfactory process involving the use of the alkaline earths in an essentially dry state for the refining of high-grade petroleum products of which the white oils may be cited as examples. The action of the alkaline earths on highly refined oils in the absence of an aqueous phase is specific and is not paralleled by a similar activity of the mono-basic caustic alkalis. The alkaline earths when employed in accordance with the methods of the present invention react with, and remove, the undesirable constituents from highly refined stocks which cause in these neutralized and doctor sweet oils, color and odor deterioration and the development of corrosive compounds. It is believed that the procedures of the present invention are the only satisfactory treating methods so far developed for effecting this improved stability of highly refined petroleum products.

In the preparation of such highly refined petroleum products as the white oils one of the most important controlling tests is that of determining under specific conditions corrosion to the copper strip. In this test a copper strip is mechanically polished with an inert abrasive material such as Tripoli powder on a dampened reclaimed towel or other cloth material free from sizing. The strip is freed of the abrasive material first by dusting with a clean dry cloth and then wiping with filter paper. The size of the copper strip which is employed is convenient for placing in a four ounce sample bottle, that is, strips measuring ½" x 3". The polished strip is then placed in a clean dry four ounce bottle containing sufficient oil to immerse completely the strip. The bottle is stoppered with a clean cork and placed in a constant temperature bath at a temperature of 210° F. for two hours. At the end of the two-hour period the sample is removed from the bath and the appearance of the copper strip compared with the appearance of a similarly polished copper strip which has been heated in an adjacent four ounce bottle containing air. The presence of corrosive substances in the oil sample is indicated by the difference in discoloration between the copper strip immersed in the oil sample and on the blank copper strip. The results are reported as:

(1) Same as blank_____ Pass #1
(2) Slight reddish discoloration_____ Pass #2
(3) Definite reddish discoloration_____ Does not pass #3
(4) Reddish discoloration with slight iridescence or brassy appearance_____ Does not pass #4
(5) Extensive iridescent, brassy or black discoloration_____ Does not pass #5

The following examples will serve to illustrate the invention. The invention, however, is not limited by the following examples which are merely presented for purposes of illustration:

*Example 1*

One liter of oil which had been treated with 32% of its volume of 20% fuming sulfuric acid and had a viscosity of 55 seconds Saybolt Universal at 100° F., and neutralized with 10% aqueous caustic soda solution, washed with a 50-50 water-isopropyl alcohol mixture, blown with steam to remove traces of alcohol and contacted immediately with 20 grams of unburnt fine Attapulgus clay for 20 minutes at 70° C. Then 40 grams of hydrated lime was added and the treatment continued for 40 minutes longer. After the removal of the solid material by passing the mixture through a blotter press a colorless oil was obtained having a pass No. 2 copper strip test. A sample of the same oil but not treated with the hydrated lime was finished in the regular way by percolation through granular clay gave a No. 5 copper strip test.

*Example 2*

A liter of oil which had been treated with 40% of its volume of 20% fuming sulfuric acid and of viscosity of 340 Saybolt Universal seconds at 100° F. was neutralized with 10% aqueous caustic soda solution, washed with an aqueous alcoholic (40% isopropyl) solution, blown with steam to remove traces of alcohol then contacted with 20 grams of unburnt fine Attapulgus clay for 20 minutes, at 70° C., and subsequently with 20 grams of hydrated lime for an additional period of 40 minutes. The mixture was then passed through a blotter press and the oil filtrate percolated through 50 grams of 30 to 60 mesh Attapulgus clay in a 1" glass filter at room temperature. The oil after this treatment gave a pass No. 1 copper strip test. A second sample of the oil treated as above except for the contacting with the hydrated lime gave a No. 4 copper strip test.

*Example 3*

A liter of oil which had been treated with 32% of its volume of 20% fuming sulfuric acid and had a viscosity of 50 Saybolt Universal seconds at 100° F., was neutralized with a 10% aqueous solution of sodium carbonate, washed with a 50-50 water-isopropyl mixture, blown with steam to remove traces of alcohol, then percolated through a bed of 80 grams of 30 to 60 mesh bauxite in a 1" glass filter tube containing 20 grams of 30 to 60 mesh hydrated lime in a layer one inch from the bottom of the filter. This percolation treatment was carried out at room temperature. The percolated oil gave a pass No. 2 copper strip test. Previous to percolation the oil gave a No. 5 test and when filtered through 100 grams of bauxite alone gave a No. 4 copper strip test.

*Example 4*

A liter of oil treated with 30% of its volume of 20% fuming sulfuric acid and of viscosity of 345 Saybolt Universal seconds at 100° F. was neutralized with 10% aqueous sodium carbonate solution, washed with a 50-50 water-isopropyl alcohol mixture, blown with steam to remove alcohol, and then percolated through a bed of granular clay. The oil was then contacted at 70° C. with 2.5 grams of powdered magnesia for one hour employing air as a means of agitation.

After the removal of the solid magnesia by filtering through paper, the oil gave a No. 1 pass copper test and did not develop a "garlic" odor after exposure to the rays of a mercury vapor lamp for eight hours. Previous to treatment with magnesia the oil gave a No. 3 copper test and developed a "garlic" odor after six hours exposure to the mercury vapor lamp.

The magnesia on the filter paper was used again with equal effect in the treatment of another quantity of clay finished oil. In fact, it has been found that magnesia may be used up to five or six times in the treatment of highly refined oils with almost equal effect.

*Example 5*

40 gallons of oil which had been previously treated with 32% of its volume of 20% fuming sulfuric acid and had a viscosity of 50 Saybolt Universal seconds at 100° F. was neutralized with a 10% aqueous sodium carbonate solution washed with a 50-50 water-isopropyl alcohol mixture, blown with steam to remove traces of alcohol and percolated through a bed of granular clay, and then contacted with sixteen pounds of hydrated lime at room temperature, using a stream of air for agitation. Samples of the oil taken immediately after the addition of the lime and for each of the four hours following gave pass No. 2 copper tests. The original oil previous to the lime treatment gave a No. 5 copper test.

As a corollary, it was found that when 0.25% by weight of lime ground in a ball mill for about eighteen hours was employed at 70° C. as the alkaline earth agent, the oil gave a pass No. 1 copper test.

In addition to lime and magnesia the carbonates of calcium and magnesium have been found to be very effective treating reagents, and in certain cases a calcium hypochlorite has been found to be very satisfactory. Hydrated lime has been found to be more satisfactory than anhydrous lime. The oxides, hydroxides and carbonates of strontium and barium are effective treating reagents but less extensively employed because of their higher cost.

It has been found that the treatment with the alkaline earth basic reacting compounds of the neutralized white oils and of the white oils after clay treating, improves the stability of the treated products with regard to the odor, color and taste as well as minimizing the development of corrosive compounds. It has been found that oils which are improved by the process of this invention with regard to the copper strip test also show similar degrees of improvement and resistance to the development of objectionable odors. Highly refined oils in the naphtha and kerosene boiling ranges used in the preparation of solvents, lacquers and spray compositions may also be treated to advantage with the alkaline earths according to the methods of the present invention in order to improve the color, odor, resistance to the formation of corrosive compounds and, in general, the stability of these materials.

While the invention has been described in detail and a number of illustrative examples have been given, it is to be understood that the invention is not limited thereby but same have been given for purposes of conveying an appreciation of the scope and nature of the invention. It will be obvious to those skilled in the art that variations of the process can be made within the spirit of the invention.

What is claimed is:

1. The process of refining white oils which comprises exhaustively treating a petroleum oil with concentrated sulfuric acid, separating the sludge, neutralizing the oil with an alkaline solution, separating the alkaline solution, washing the oil to remove sulfonate soaps and then chemically stabilizing the oil by treating with an essentially dry alkaline earth basic reacting compound.

2. The process of refining mineral white oils which comprises exhaustively treating a petroleum oil of lubricating oil consistency with concentrated sulfuric acid, separating the sludge, then neutralizing the oil with an aqueous alkali solution, separating the aqueous solution, washing the oil with a water-isopropyl alcohol mixture, treating the oil with steam and then with air to remove traces of isopropyl alcohol and water, treating the oil with clay and then chemically stabilizing the oil by treating with a dry alkaline earth basic reacting compound.

3. The process of refining mineral white oils which comprises exhaustively treating a petroleum oil of lubricating oil consistency with concentrated sulfuric acid, separating the sludge, then neutralizing the oil with an aqueous alkali solution, separating the aqueous solution, washing the oil with a water-isopropyl alcohol mixture, treating the oil with steam and then with air to remove traces of isopropyl alcohol and water, contacting the oil with clay and then chemically stabilizing the oil by treating with an alkaline earth basic reacting compound.

4. The process of refining mineral white oils which comprises exhaustively treating a petroleum oil of lubricating oil consistency with concentrated sulfuric acid, separating the sludge, then neutralizing the oil with an aqueous alkali solution, separating the aqueous solution, washing the oil with a water-isopropyl alcohol mixture, treating the oil with steam and then air to remove traces of isopropyl alcohol and water, contacting the oil with clay, and then chemically stabilizing the oil by treating with an alkaline earth basic reacting compound separating from the resultant mixture the clay and alkaline earth basic reacting compound and then percolating the thus purified oil through clay.

5. The process according to claim 4 in which the alkaline earth basic reacting compound employed is lime.

6. The process according to claim 4 in which the alkaline earth basic reacting compound employed is magnesia.

7. The process of refining mineral white oils which comprises exhaustively treating a petroleum oil of lubricating oil consistency with concentrated sulfuric acid, separating the sludge, then neutralizing the oil with aqueous alkali, separating the aqueous solution washing the oil with a water-isopropyl alcohol mixture, treating the oil with steam and subsequently with air to remove traces of isopropyl alcohol and water, and stabilizing the oil by percolating through alkaline earth basic reacting compound admixed with clay.

8. The process of refining mineral white oils which comprises exhaustively treating a petroleum oil of lubricating oil consistency with concentrated sulfuric acid, separating the sludge, then neutralizing the oil with an aqueous alkali solution, separating the aqueous solution, washing the oil with a water-isopropyl alcohol mixture, treating the oil with steam and subsequently with air to remove traces of isopropyl alcohol and water, and then stabilizing the oil by percolating through clay admixed with lime.

9. The process of refining mineral white oils which comprises exhaustively treating a petroleum oil of lubricating oil consistency with concentrated sulfuric acid, separating the sludge, then neutralizing the oil with an aqueous alkali solution, separating the aqueous solution, washing the oil with a water-isopropyl alcohol mixture, treating the oil with steam and then air to remove traces of isopropyl alcohol and water, then saibilizing the oil by percolating through clay admixed with magnesia.

10. The process of refining mineral white oils which comprises exhaustively treating a petroleum oil of lubricating oil consistency with concentrated sulfuric acid, separating the sludge, then neutralizing the oil with an aqueous alkali solution, separating the aqueous solution, washing the oil with a water-isopropyl alcohol solution, treating the washed oil with steam and then air to remove traces of isopropyl alcohol and water, then stabilizing the oil by passing together with pulverized alkaline earth basic reacting compound through a colloid mill, and separating the solid material from the oil.

ALBERT P. GIRAITIS.